UNITED STATES PATENT OFFICE.

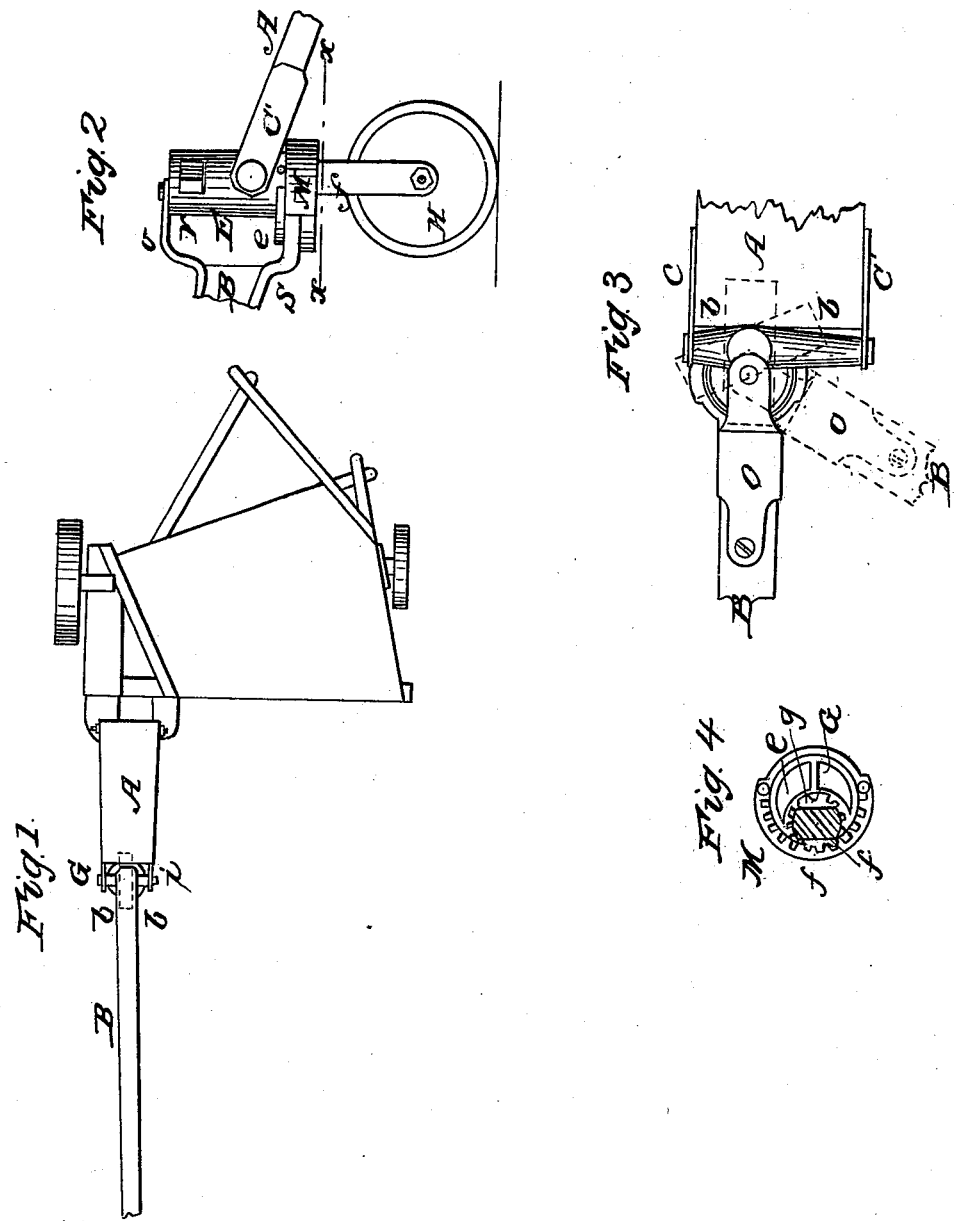

SOLOMON T. HOLLY, OF ROCKFORD, ILLINOIS, ASSIGNOR TO FREDERICK H. MANNY, OF SAME PLACE.

IMPROVEMENT IN HARVESTERS.

Specification forming part of Letters Patent No. 39,014, dated June 23, 1863.

*To all whom it may concern:*

Be it known that I, SOLOMON T. HOLLY, of Rockford, in the county of Winnebago and State of Illinois, have invented a new and Improved Mode of Turning Harvesting-Machines, of which the following is a full and exact description, reference being had to the accompanying drawings, which make part of this specification, and in which—

Figure 1 represents a plan or top view of a harvesting-machine to which my improvement is applied. Fig. 2 represents a view in elevation, on a larger scale, of the caster, and of portions of the tongue and reach-plank. Fig. 3 represents a plan or top view of the same, the black lines showing the position of the parts when moving straight forward, while the blue lines show the relative changes of the position of the tongue and caster when turning. Fig. 4 represents a horizontal section through the same at the line $x\,x$ of Fig. 2, showing the details of the mechanism by which the caster is caused to turn more rapidly than the tongue, the parts in this view being shown as both reversed and inverted from the position they occupy in the other figures.

It has heretofore been usual to keep the forward end of a harvesting-machine at the desired distance from the ground by a rigid support having a caster-wheel at its foot; or a truck was sometimes used instead of the caster. Both of these modes of support for the forward end of the harvester are extremely objectionable. The former involves the necessity of using a tongue rigid in the direction of the draft, and this, whenever it becomes necessary to turn the machine, makes the caster drag sidewise over the ground, and brings the side draft thus endwise injuriously against the team. The latter, although it to some extent avoids the side draft and its attendent inconvenience, requires the leading truck to be placed so far in advance of the cutter and its driving mechanism as to involve the necessity of backing the machine at the end of every swath to bring the cutter readily into position to commence the new swath, for if the machine be turned with the truck it will not be in a proper position to commence a full cut in the new direction, besides which there is always a tending of the truck to drag or swing sidewise while turning the machine at a right angle.

Now, the object of my improvement is to obviate all these difficulties, to turn the machine at a right angle upon the driving-wheel as on a pivot, and to have the cutter at once in place to commence a full cut; and my invention consists in hinging the tongue to the forward part of the harvesting-machine, and so attaching the support for the front of the machine to the back end of the tongue by a swivel-joint as to admit the tongue readily to be turned either toward or from the divider.

My invention further consists in the employment of a geared segment, cam, or eccentric fixed upon and moved by the tongue so as to rotate the spindle that sustains the caster and supports the front of the harvester so much faster than the tongue as to cause the caster in its axial rotation always to move in the arc of the radius of the main driving-wheel, or of that point of its perimeter that is on the ground at the moment when the machine is to be turned.

My invention further consists in so combining a segment and geared pinion with the supports of the front of a harvester as to swivel the machine on the main driving-wheel, and render it capable of turning a right angle and at once starting a full cut in a new direction.

To enable others skilled in the art to make and use my invention, I will proceed to describe its construction and the mode in which it operates.

In the accompanying drawings, A represents the reach-plank or forward end of the harvesting-machine, which requires support; B, the tongue; $c\,c'$ are straps of suitable strength, attached to the sides of the reach-plank in any secure manner, and having holes or boxes in their projecting ends to secure the trunnions $b$ and $b'$; or these straps may be dispensed with and hinges substituted to connect the trunnions with the reach. The trunnions project from the opposite sides of a sleeve-hub or spindle-box, E, having a ring, $e$, at its lower end, and surrounding and sustaining a nicely-fitting spindle, $f$, on which spindle is secured a pinion, $g$. The lower end of the spindle is bifurcated to secure and sustain a caster-wheel, H. The rear end of the tongue is also bifurcated, its upper arm, $o$, being secured to the top of the spindle-box, and its lower arm, $s$, sustaining a ring, M, one-half of the inner surface of which is divided into segment-teeth that gear accurately with the teeth upon the pinion $g$ on the spindle. The ring $e$ on the spindle-box and the ring M on the lower arm of the bifurcated tongue are both eccentric to the spindle and concentric with each other. The ring on the hub fits nicely and works smoothly within the ring on the tongue, and thus always secures a smooth and accurate movement of the teeth on the pinion with those on the segment, and keeps them in gear. A slot, $r$, in the top of the spindle-box permits a key to be passed through the top of the spindle to prevent it from pulling out of the hub.

In operation the team draws the harvester to the edge of the grain in cutting the first swath, and when this is finished stops and turns at any angle to suit the form of the field. To turn to the left at a right angle in a square field, as the team comes round the segment-teeth turn the pinion on the spindle carrying the caster. The difference between the gearing on the pinion and that on the segment attached to the tongue causes the spindle to turn on its axis with the hub more rapidly than the tongue turns, and thus moves the caster so that its axial rotation shall always be on the arc of the radius of the driving-wheel, while the driving-wheel is simply turned as on a pivot, and the moment the tongue completes the change to a direction at a right angle to the first swath the machine is in a position to let the team move straight forward and bring the cutter against the grain over its entire length.

It is obvious that an eccentric or cam might be so arranged as to operate as the equivalent of the gearing in turning the spindle.

What I claim as my invention, and desire to secure by Letters Patent, is—

1. Hinging the tongue of a harvesting-machine to the reach by trunnions attached to a hub that carries a caster-spindle so constructed that the caster is caused to turn with its spindle, substantially in the manner and for the purpose set forth.

2. The attachment of the reach of the harvesting-machine to the tongue by means of a hinged hub and caster-spindle, when the spindle has a positive axial rotation imparted to it from the right or left movement of the tongue, and turns more rapidly than the tongue, substantially in the manner and for the purpose set forth.

3. The combination of the segment-ring M, the eccentric ring $e$, and the pinion $g$, or their mechanical equivalents, substantially in the manner and for the purpose described.

In testimony whereof I have hereunto subscribed my name.

SOLOMON T. HOLLY.

Witnesses:
    JAMES L. LINDERMAN,
    J. G. MANLOVE.